United States Patent
Stanton et al.

(10) Patent No.: US 7,600,658 B2
(45) Date of Patent: Oct. 13, 2009

(54) VISCOUS MATERIAL FEED SYSTEM WITH PLATEN AND METHOD

(75) Inventors: Jennifer L. Stanton, Clifton, NY (US); Harry A. Bayly, Mechanicville, NY (US); Roger Knox, Clifton Park, NY (US)

(73) Assignee: Momentive Performance Materials, Albany, NY (US)

( * ) Notice: Subject to any disclaimer, the term of this patent is extended or adjusted under 35 U.S.C. 154(b) by 428 days.

(21) Appl. No.: 11/563,810

(22) Filed: Nov. 28, 2006

(65) Prior Publication Data

US 2008/0122188 A1  May 29, 2008

(51) Int. Cl.
*G01F 11/00* (2006.01)
(52) U.S. Cl. ............... 222/259; 222/58; 222/80; 222/319; 222/387; 222/405; 222/1
(58) Field of Classification Search .......... 222/58, 222/80, 256–262, 319–320, 386–387, 389, 222/405, 1
See application file for complete search history.

(56) References Cited

U.S. PATENT DOCUMENTS

| | | | | |
|---|---|---|---|---|
| 3,244,333 | A | * | 4/1966 | Kohn et al. ............. 222/386 |
| 4,067,483 | A | | 1/1978 | Mucke |
| 4,071,168 | A | | 1/1978 | Stone |
| 4,154,044 | A | | 5/1979 | Lang |
| 4,221,102 | A | | 9/1980 | Lang |
| 4,284,597 | A | * | 8/1981 | Stein ............... 264/130 |
| 4,402,428 | A | | 9/1983 | Lang |
| 4,693,286 | A | * | 9/1987 | Lock et al. ............. 141/61 |
| 4,693,397 | A | * | 9/1987 | Lang ................. 222/137 |
| 4,874,022 | A | | 10/1989 | Schwerdtel |
| 4,921,132 | A | * | 5/1990 | Wales et al. ............ 222/57 |
| 4,986,717 | A | * | 1/1991 | Cummins et al. ...... 414/416.04 |
| 5,078,304 | A | | 1/1992 | Schneider |
| 5,137,368 | A | | 8/1992 | Kistner |
| 5,360,146 | A | | 11/1994 | Ikushima |
| 5,377,815 | A | | 1/1995 | Vetter |
| 5,385,274 | A | * | 1/1995 | Twyman ............... 222/327 |
| 5,417,169 | A | | 5/1995 | Carpenter |

(Continued)

FOREIGN PATENT DOCUMENTS

DE  91 01 116 U1  8/1991

(Continued)

*Primary Examiner*—Kevin P Shaver
*Assistant Examiner*—Andrew P Bainbridge
(74) *Attorney, Agent, or Firm*—Philip D. Freedman PC; Philip D. Freedman; Kenneth S. Wheelock (57) ABSTRACT

A viscous material feed system, comprises a feed tube that receives material expressed from a container; and a container evacuator comprising a chamber to hold a container to express material from the container to the feed tube and a plunger comprising a platen axially and slidably accommodated within the chamber, the platen comprising an O-ring fitted against a platen driving face; a full ring with tabs extending to secure the O-ring to the platen driving face with a circumferential surface exposed to the chamber and a vacuum breaker valve to the chamber that seals the platen face when in contact with container material and retains residual material adhering to the platen face when the valve is activated at a termination of a driving cycle of the platen through a container content.

15 Claims, 7 Drawing Sheets

U.S. PATENT DOCUMENTS

| | | |
|---|---|---|
| 5,671,873 A | 9/1997 | Hammerl |
| 5,797,516 A * | 8/1998 | Brandl ........................ 222/80 |
| 6,056,153 A * | 5/2000 | Inoue ............................ 222/1 |
| 6,211,267 B1 | 4/2001 | Suto |
| 6,391,234 B1 | 5/2002 | Silvi |
| 6,414,054 B1 | 7/2002 | Boffard |
| 6,444,154 B1 | 9/2002 | Boudreau |
| 6,474,971 B1 | 11/2002 | Dong |
| 6,499,001 B1 | 12/2002 | Meyer |
| 6,572,253 B2 | 6/2003 | Silvi |
| 6,604,559 B2 | 8/2003 | Rubin |
| 6,749,786 B2 | 6/2004 | Boudreau |
| 7,127,472 B1 | 10/2006 | Enokida |
| 2003/0071082 A1 | 4/2003 | Johnson et al. |
| 2005/0241774 A1 | 11/2005 | Hart |

FOREIGN PATENT DOCUMENTS

| | | |
|---|---|---|
| FR | 2 544 699 A | 10/1984 |

\* cited by examiner

VISCOUS MATERIAL FEED SYSTEM WITH PLATEN AND METHOD

BACKGROUND OF THE INVENTION

The invention relates to a viscous material feed system with a platen and method, in particular for a viscous material processing system.

In a viscous material processing system, feed is mixed and additives are injected in precise proportions to produce a customized product. The system requires exact and reliable dosing and feed operations to achieve uniform products with narrow tolerance properties. Feed material for these processes can be delivered to processing sites in various containers. When delivered, the material must be removed from the container for processing. For example, a processing system can require emptying material such as silicone gum from drums or similar containers. However, the feed material may be very viscous and resistant to flow and hence, resistant to removal from the delivery container.

Some container emptying processes use a plunger to drive through the container to empty its content. In these processes, a flat forward platen of the plunger imposes upon the material to drive it from the container for further processing. However, forcibly driving material from a container requires that both container ends be open. The open ends can adversely affect container integrity. Forcibly emptying the open container can result in rupture and loss of material. Other less robust emptying methods avoid container collapse but fail to completely empty a container. There is a need for a device and method to remove viscous material from a container to empty all the material without collapsing the container.

BRIEF DESCRIPTION OF THE INVENTION

The invention provides a system and method to express substantially all material from a container to a viscous material processing system without collapsing the container.

In an embodiment, the invention is a viscous material feed system, comprising: a feed tube that receives material expressed from a container; and a container evacuator comprising a chamber to hold a container to express material from the container to the feed tube and a plunger comprising a platen axially and slidably accommodated within the chamber, the platen comprising an O-ring fitted against a platen driving face; a full ring with tabs extending to secure the O-ring to the platen driving face with a circumferential surface exposed to the chamber and a vacuum breaker valve to the chamber that seals the platen face when in contact with container material and retains residual material adhering to the platen face when the valve is activated at a termination of a driving cycle of the platen through a container content.

In another embodiment, the invention is a viscous material feed method, comprising: driving a platen face against a surface of a viscous material held in a container; creating a vacuum between the platen face and viscous material surface to adhere residual material from the container to the platen face; differentially breaking the vacuum at a circumference of the residual adhered material to retain the residual material adhered to the platen face to permit withdrawal of the residual material from the container along with the platen face.

In another embodiment, the invention is a viscous material processing system, comprising: a container evacuator comprising a platen comprising at least two ports through the platen, the ports located at balancing equal circumferential spacings from a central activating piston to the platen; and a compounding system that receives viscous material expressed from a container by the container evacuator.

In another embodiment, the invention is a container evacuator, comprising: a chamber to hold a container to express material from the container to a feed tube; and a plunger comprising a platen axially and slidably accommodated within the chamber, the platen comprising an O-ring fitted against a platen driving face; a full ring with tabs extending to secure the O-ring to the platen driving face with a circumferential surface exposed to the chamber and a vacuum breaker valve to the chamber that seals the platen face when in contact with container material and retains residual material adhering to the platen face when the valve is activated at a termination of a driving cycle of the platen through a container content.

In still another embodiment, the invention is a viscous material feed system, comprising: a feed tube that receives material expressed form a container; and a container evacuator comprising a platen comprising at least two parts through the platen, the ports located at balancing equal circumferential spacings from a central activating piston to the platen, wherein the piston drives the platen through the container to express material through the ports to the feed tube.

In another embodiment, the invention is a viscous material processing system, comprising: a container evacuator comprising a chamber to hold a container to express material from the container to the feed tube and a plunger comprising a platen axially and slidably accommodated within the chamber, the platen comprising an O-ring fitted against a platen driving face; a full ring with tabs extending to secure the O-ring to the platen driving face with a circumferential surface exposed to the chamber and a vacuum breaker valve to the chamber that seals the platen face when in contact with container material and retains residual material adhering to the platen face when the valve is activated at a termination of a driving cycle of the platen through a container content; a controller that drives the container evacuator; a feed tube that receives material expressed from a container by the container evacuator according to the controller; and a cutter that severs material from the feed tube to meter the material to a processor according to the controller.

In still another embodiment, the invention is a silicone gum processing system, comprising: a silicone gum compounding system; and a viscous material feed system to the compounding system, the feed system comprising a container evacuator comprising a chamber to hold a container to express silicone gum from the container to the feed tube and a plunger comprising a platen axially and slidably accommodated within the chamber, the platen comprising an O-ring fitted against a platen driving face; a full ring with tabs extending to secure the O-ring to the platen driving face with a circumferential surface exposed to the chamber and a vacuum breaker valve to the chamber that seals the platen face when in contact with container silicone gum and retains residual silicone gum adhering to the platen when the valve is activated at a termination of a driving cycle of the platen through a container content.

In another embodiment, the invention is a viscous material feed method, comprising: driving a platen face against a surface of a viscous material held in a container to express the material from the container through symmetrically located ports through the platen face to a feed tube; and cutting material from the feed tube to a viscous material compounding system.

BRIEF DESCRIPTION OF THE DRAWINGS

FIG. 7 is a perspective.

DESCRIPTION OF THE INVENTION

The invention relates to the handling of a viscous material such as a silicone gum. "Silicone gum" includes a viscous silicone or polysiloxane or organopolysiloxane that has the chemical formula $[R_2SiO]_n$, where R=organic groups such as methyl, ethyl, and phenyl. These materials typically comprise an inorganic silicon-oxygen backbone ( . . . —Si—O—Si—O—Si—O— . . . ) with attached organic side groups, which can be four-coordinate. In some cases, organic side groups can be used to link two or more of these —Si—O— backbones together.

By varying the —Si—O— chain lengths, side groups, and crosslinking, silicones can be synthesized with a wide variety of properties and compositions. They can vary in consistency from liquid to gel to rubber to hard plastic. Silicone rubber or silicone gum is a silicone elastomer, typically having high temperature properties. A silicone gum can have a viscosity range between 150,000-900,000 poise at 25° C.

Silicone rubber offers resistance to extreme temperatures, being able to operate normally from minus 100° C. to plus 500° C. In such conditions tensile strength, elongation, tear strength and compression set can be superior to conventional rubbers.

A silicone gum can be extruded or molded into custom shapes and designs such as tubes, strips, solid cord or custom profiles within size restrictions specified by a manufacturer. Cord can be joined to make "O" Rings and extruded profiles can also be joined to make up seals.

It is desirable to provide a viscous feed system that accurately and efficiently processes viscous materials such as silicone gum for use in various applications. However, these materials can be highly resistant to flow, highly adhering, highly cohering, and/or shear thickening and consequently difficult to handle. Accuracy of a packaging process and/or accuracy of a process of obtaining a defined quantity of such material, for example in a continuous process, is costly when substantial time is required for cutting or separating a quantity of the material from a larger quantity or for removing material from a container.

The invention provides a system and method to control processing of viscous material. Features of the invention will become apparent from the drawings and following detailed discussion, which by way of example without limitation describe preferred embodiments of the invention.

Figure 1:
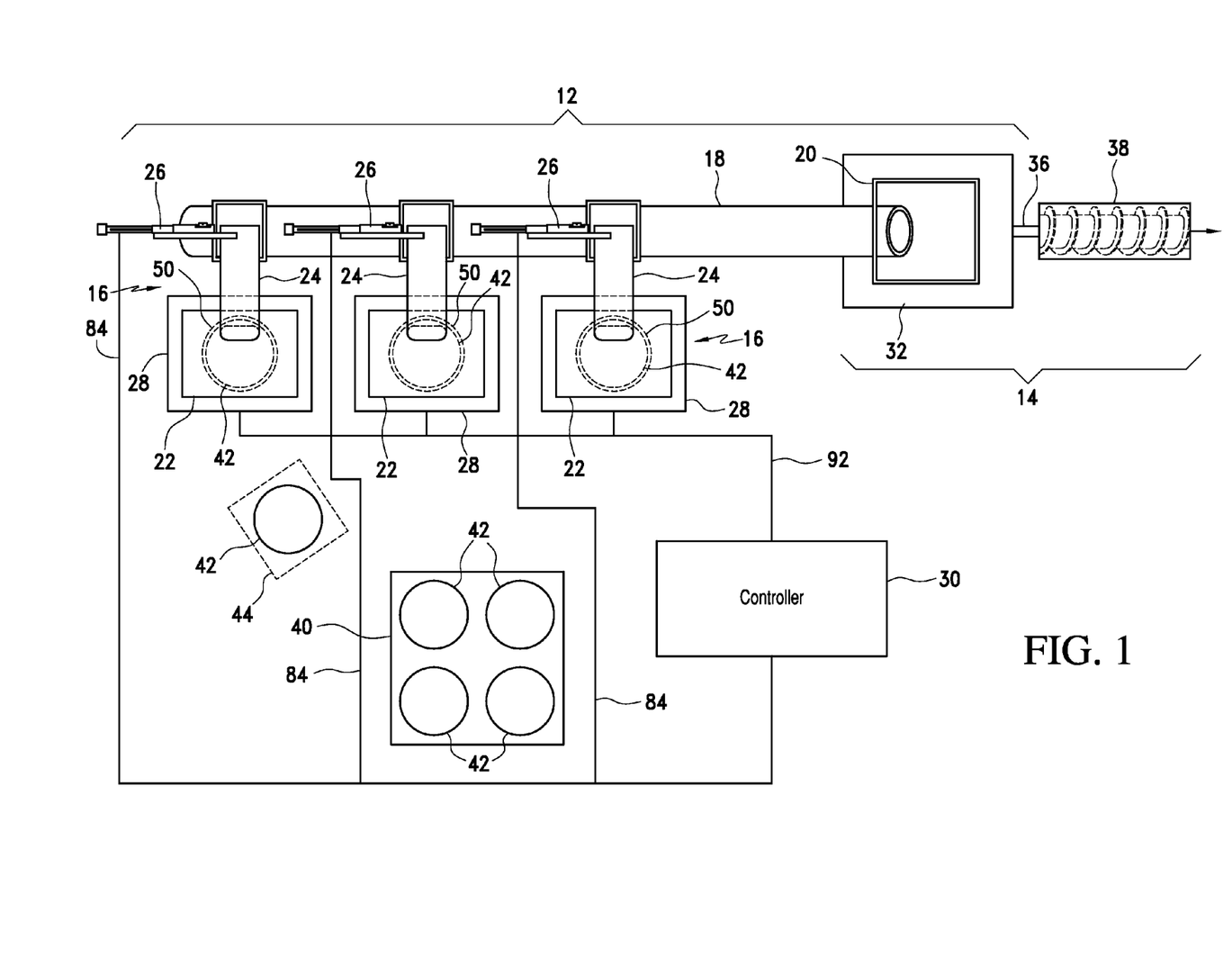
FIG. 1, FIG. 2 and FIG. 3 are schematic representations of a material processing system.
Figure 2:
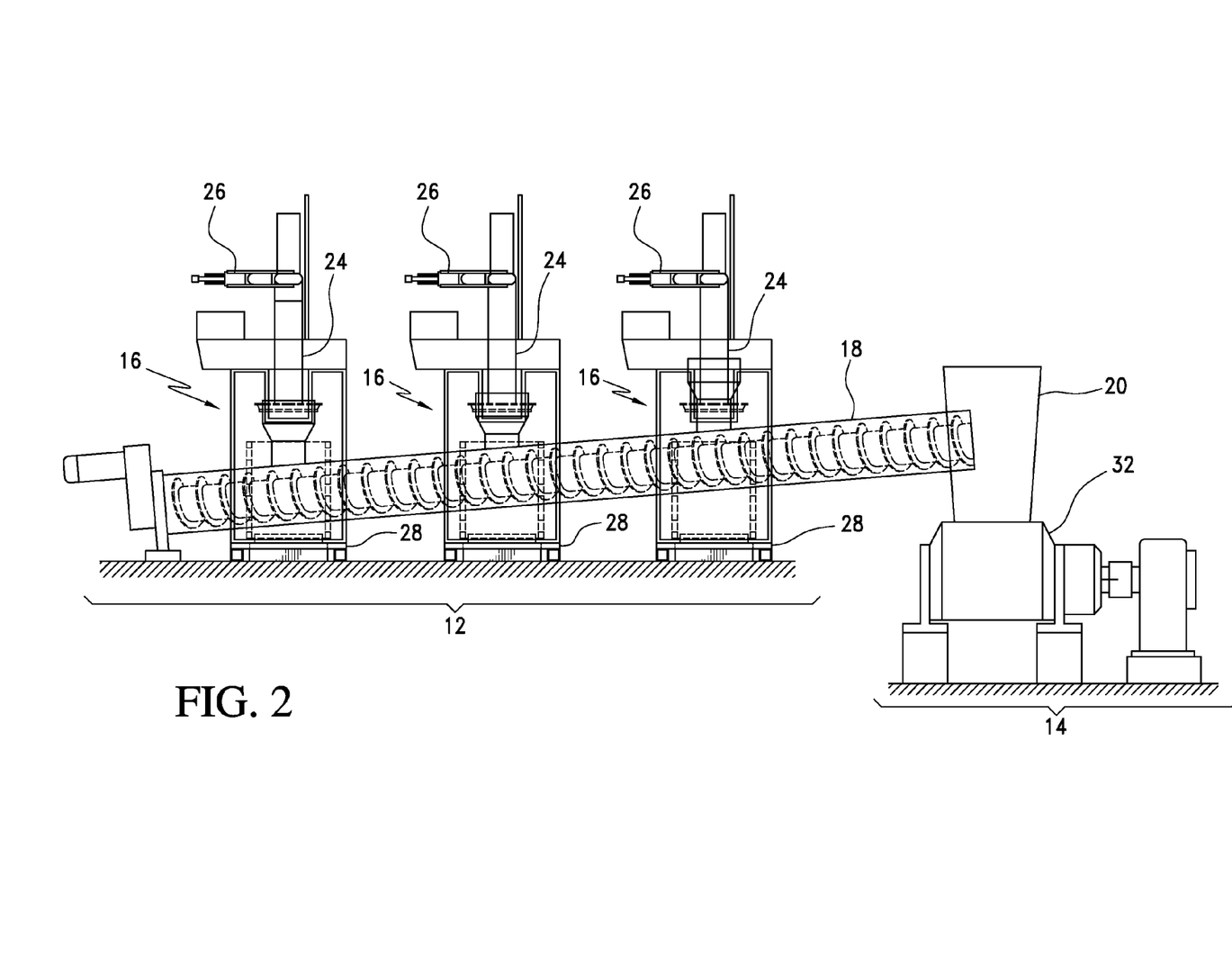
Figures 3, 6:
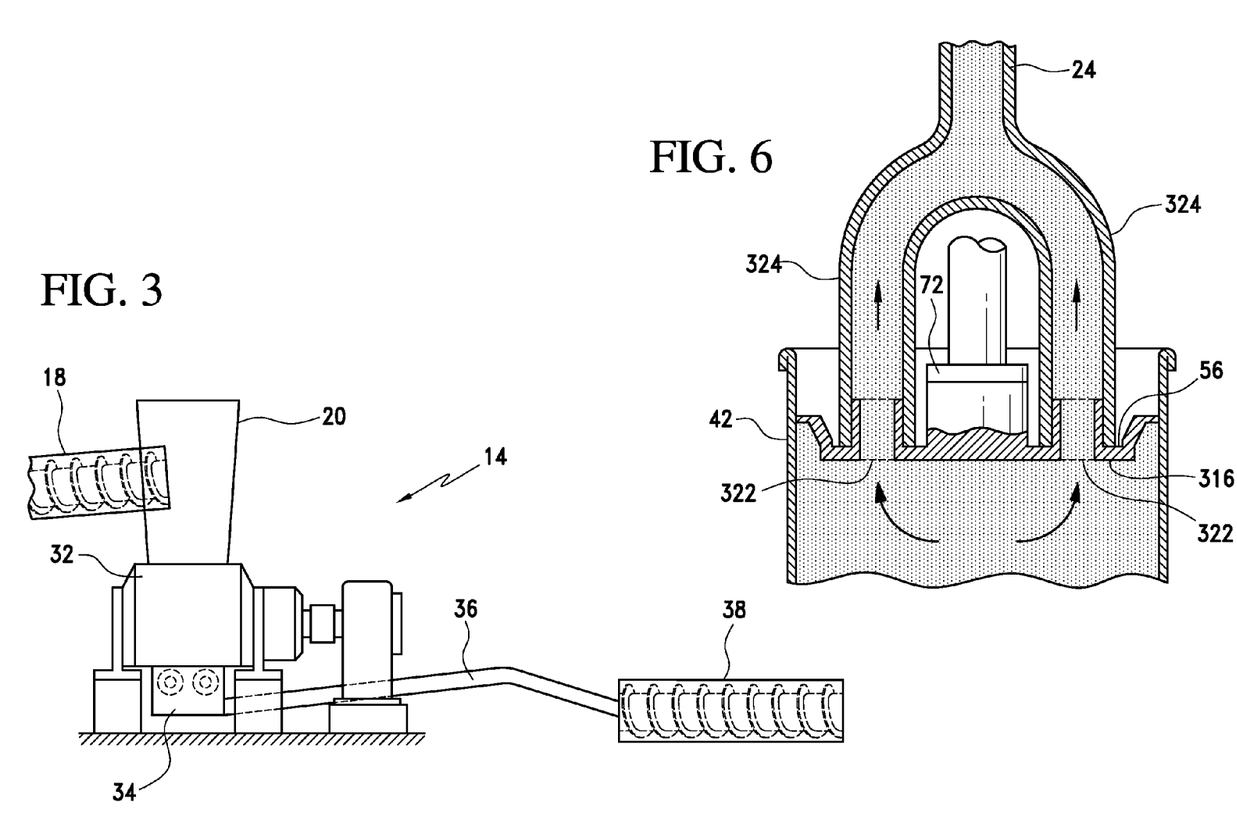
FIG. 6 is a cut away view of a section of a drum press.
Figure 4:
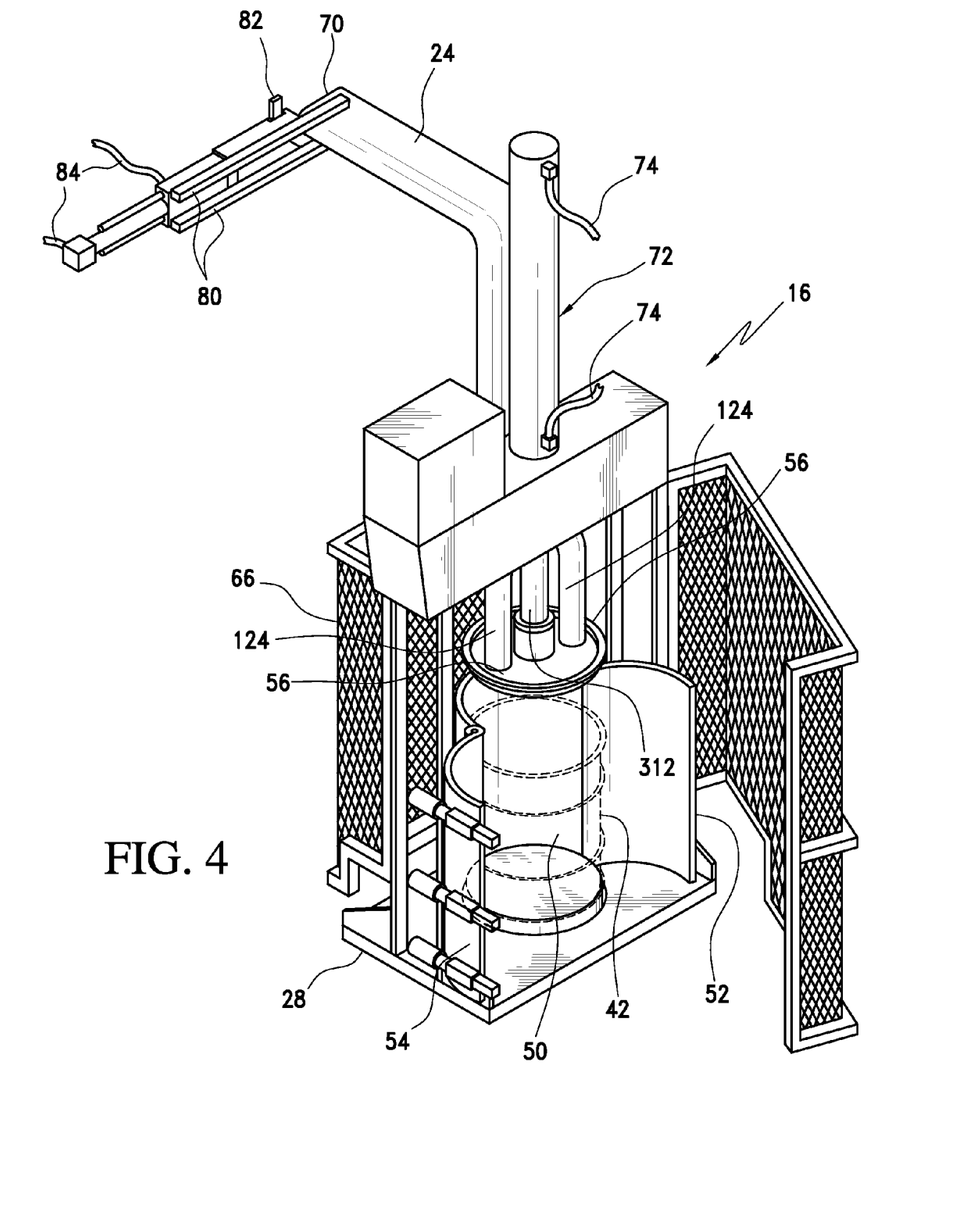
FIG. 4 and FIG. 5 are perspective views of a drum press.
Figure 5:
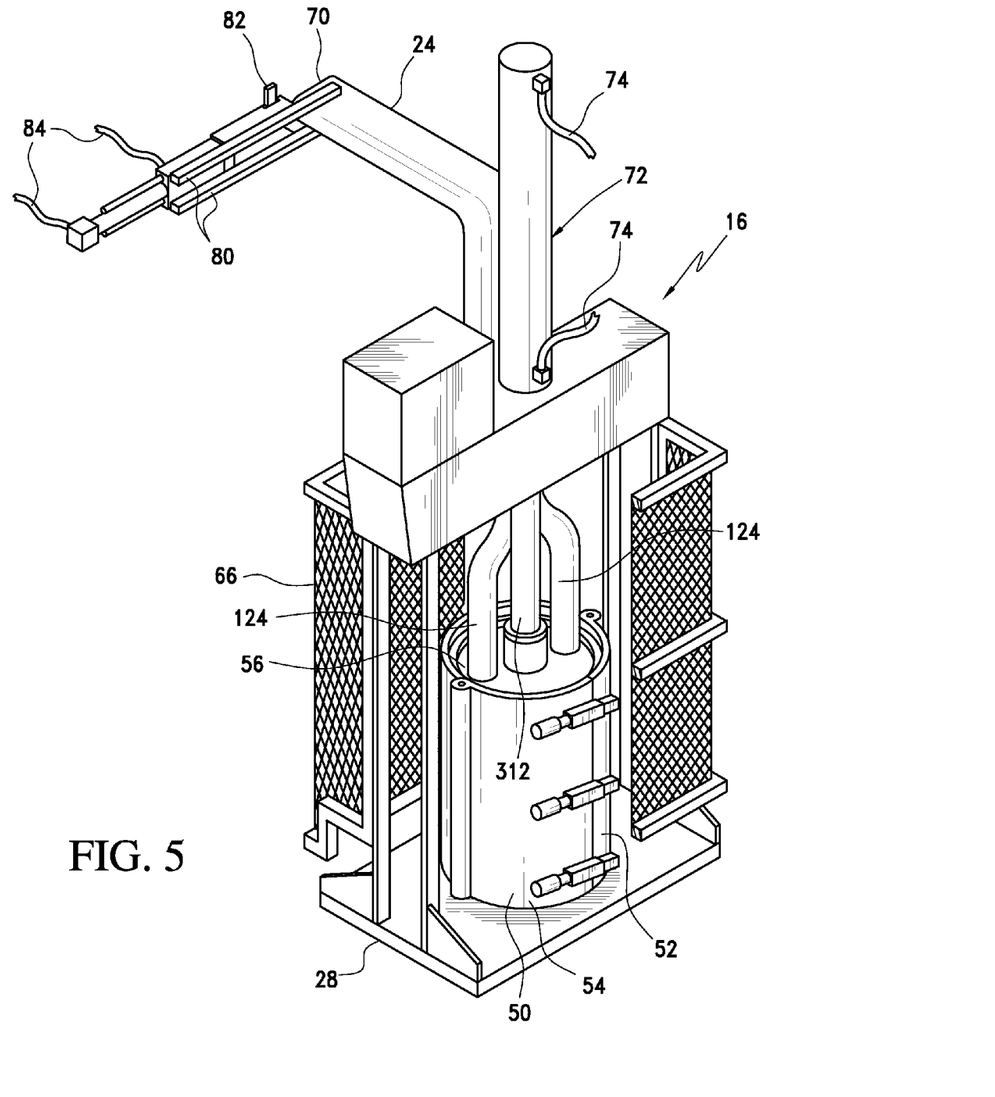

The drawings illustrate the invention as a process to compound silicone gum into a base for forming articles. In the drawings, FIG. 1 is a schematic top view representation and FIG. 2 is a schematic side view representation of a section of a material processing system 10 showing an integrated feed system 12 and compounding system 14. The feed system 12 includes a battery of material extracting apparatus (MEA) 16, conveyor 18 and chute 20. FIG. 4 and FIG. 5 are elevation views of an MEA 16 and FIG. 6 is a cut away side sectional view of a section of MEA 16. The MEA 16 includes container evacuator 22, feed tube 24, cutting apparatus 26 and floor scale 28. The integrated feed system 12 is controllably connected to controller 30. FIG. 6 is a cut away view of an upper section of the drum press MEA 16 of FIG. 4 and FIG. 5. As shown in FIG. 1, FIG. 2 and FIG. 3, compounding system 14 includes mixer 32, roll mill 34, conveyor belt 36 and compounder 38.

The MEA 16 serves to express the viscous material from a container to the compounding system 14. By "express" is meant to squeeze, force or press out the viscous material from the container. In a preferred compounding operation of the invention with respect to FIG. 1, FIG. 2 and FIG. 3, operation commences with delivery of a pallet 40 of four drums 42 of gum. The drawings embodiment illustrates a feed system including a method of evacuating a silicone gum-containing drum 42. A suitable drum 42 in the embodiment, has fully openable ends and has a cylindrical wall of steel, fiberboard or other material structure for transporting a silicone gum material. The drum 42 has opposite ends, each of which is openable to accommodate a movable plunger at one end as hereinafter described.

The material in the drums 42 may be identical or it may be of a variety of physical properties such as viscosity. The drums 42 are removed from the pallet 40 one by one by drum hauler 44 such as from Easy Lift Equipment Co., Inc., 2 Mill Park Court, Newark, Del. 19713. The lid of each of three drums 42 is removed and each of the drums 42 is loaded by the hauler 44 into a respective container evacuator 22, which may be a modified Schwerdtel S 6-F drum press. Use of the drum hauler 44 eliminates ergonomic risks associated with lifting and handling the heavy drums 42. The silicone gum is then forced from each drum by an MEA 16 into the conveyor 18. In the drawings embodiment, an MEA 16 comprises a container evacuator 22, feed tube 24 and cutting apparatus 26.

As illustrated in FIG. 4 and FIG. 5, the container evacuator 22 is a press that comprises a substantially cylindrical chamber 50 with hinged enclosures 52 and 54 for securing a drum 42 removably within the chamber 50. The chamber 50 and hinged enclosures 52 and 54 securely cradle the drum 42 during a material extracting operation. A disc-shaped platen 56 fits into the chamber 50 with a flat driving surface. Platen face 316 is oriented perpendiculars to the longitudinal axis of the chamber 50 and correspondingly perpendicular to the longitudinal axis of a drum 42 held within the chamber 50.

The operation of feed system 12 can be described with reference to FIG. 1, FIG. 2, FIG. 4, FIG. 5 and FIG. 6. In operation, the press enclosures 52 and 54 are unlatched by activating fasteners 110 to open enclosures 52 and 54. The drum hauler 44 is used to load a first drum 42 into the press cavity 60. The drum 42 is positioned by a locator ring 62 at the base 64 of the chamber 50. The press enclosures 52 and 54 resist axial expansion pressure exerted by plunger 72 driving through drum 42. The enclosures 52 and 54 are secured by a plurality of fasteners.

Each MEA 16 includes the container evacuator 22, feed tube 24 and cutting apparatus 26 and cage 66 and each is set on a respective floor scale 28. In each MEA 16, the feed tube 24 is connected through the disc shaped platen 56 to communicate with the press cavity 60. The platen 56 is driven by hydraulic plunger 72.

Figure 7:
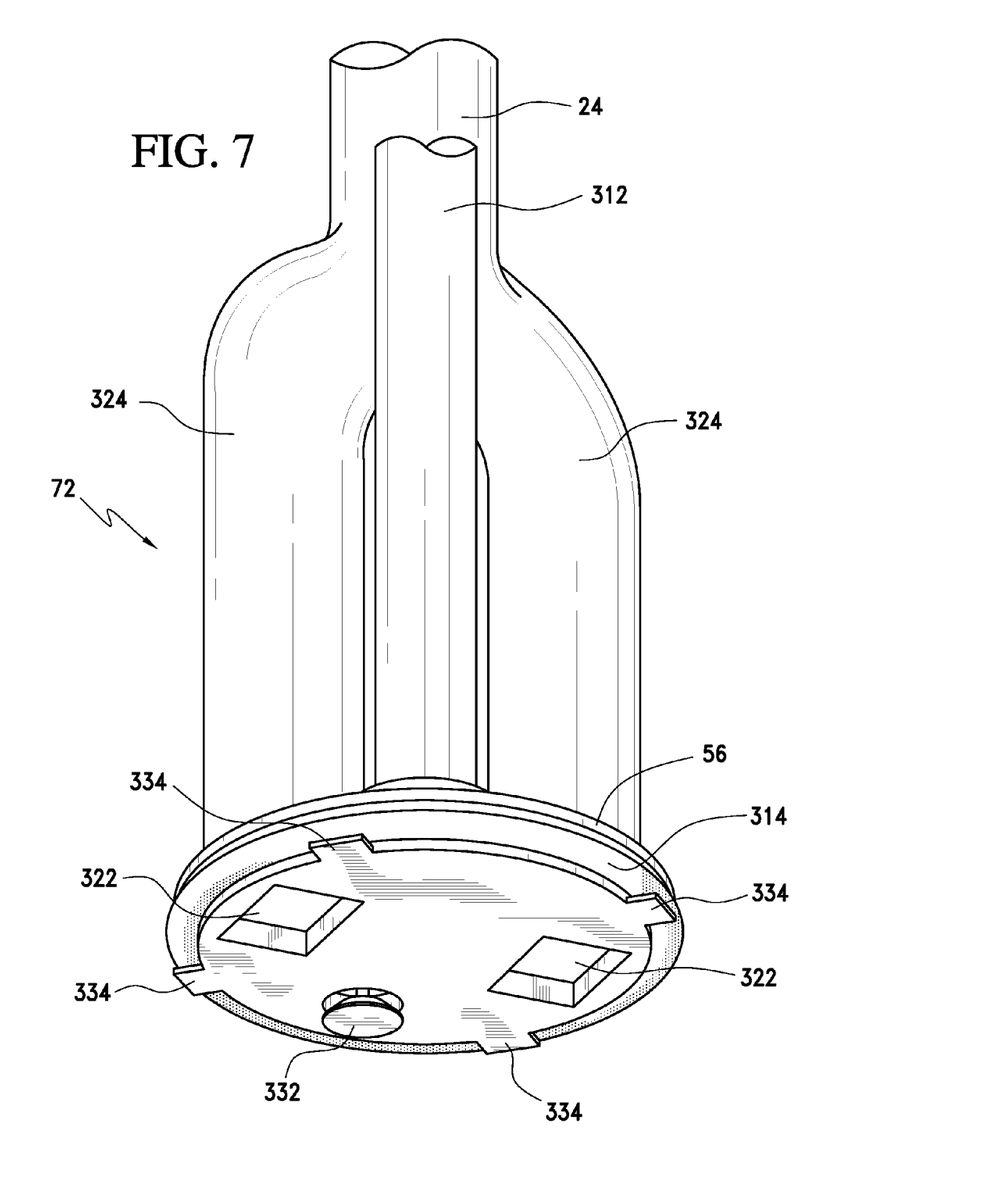
Figures 8, 9:
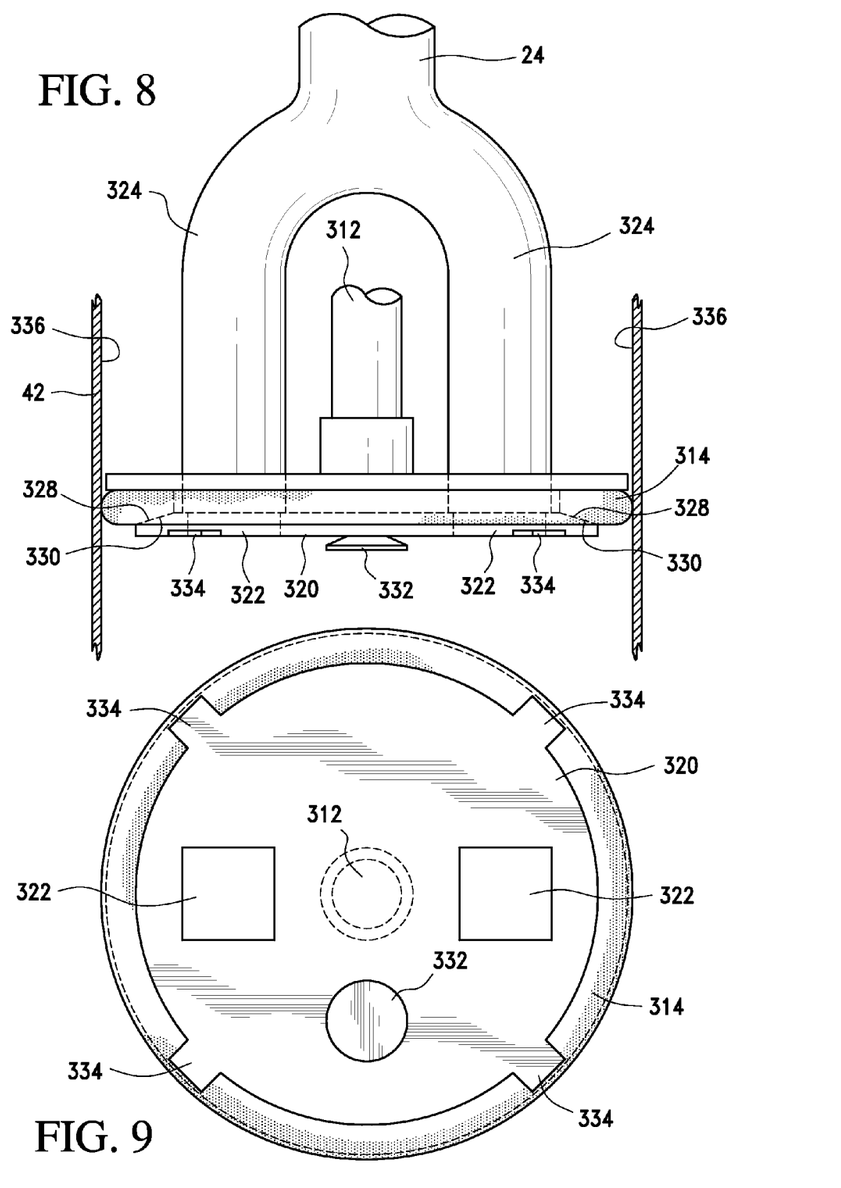
FIG. 8 is a side elevation and FIG. 9 is a bottom view of a platen.

FIG. 7 is a perspective view of the plunger 72 that provides a mechanism to express viscous material from a drum according to a preferred embodiment of the invention. A preferred plunger 72 shown in FIG. 7, FIG. 8 and FIG. 9, includes disc-shaped platen 56 drive by activating piston 312. O-ring 314 fits to the platen 56 face 316 to seal platen 56 outer circumference to inner wall 336 of drum 42. The O-ring 314 is held in place by a full ring 320 that is affixed to platen face 316 to partially encompass the O-ring 314 but with exposed portion that extends circumferentially beyond the outer circumference of both platen 56 and the full ring 320.

Shown are two ports 322 through the full ring 320 and platen 56 to communicate with respective conduit tines 324 that converge to feed tube 24 as shown in FIG. 6. The ring 320 has tabs 334 welded to full ring 320 to extend across the exposed outer circumference surface of the O-ring 314. FIG. 11 is an elevation that shows abutment of beveled circumference edge surface 328 of the full ring 320 to a corresponding sloped edge surface 330 of the O-ring 314.

An operator can commence system operation at controller 30. When a cycle is activated by the operator, a plunger 72 of each container evacuator 22 of the battery shown in FIG. 1 is activated via control lines 84. Then, as the screw conveyor 18 starts turning, the press platen 56 with connected feed tube 24 is forced by hydraulically driven plunger 72 to travel down into the drum 42 interior.

As platen 56 is driven into drum 42, displaced air is exhausted through vacuum breaker 332. When the platen face 316 contacts drum material, the vacuum breaker valve 332 closes to seal the platen face 316 and the O-ring 324 seals the side of the platen 316 to the inside wall 336 of drum 42 (shown in FIG. 8). As further illustrated in FIG. 6, as platen 56 traverses the drum 42 longitudinal axis within the press cavity 60, drum contents are displaced upward into connecting ports 322 of the feed tube 24. As the platen 56 completes traversing the drum axis, material is forced upward into the feed tube 24 to be eventually expelled from the feed tube discharge port 70. Then as the platen 56 is raised from the drum 42 bottom, a vacuum is created below the platen 56 and the O-ring 314 is caused to slightly sag between tabs 334. This results in residual viscous material from the drum 42 adhering to the platen face 313 to complete the drum 42 evacuation as the platen is withdrawn at the termination of a driving cycle.

While applicant does not intend to be bound by any particular mechanism, it is believed that substantially all material is emptied from the drum 42 as the platen 56 is withdrawn because vacuum breaks first at the edge of the platen, rather than the vacuum breaker/vent valve. The edge vacuum break is caused by the O-ring 314 sag and its bevel/slope 328/330 interface with full ring 320. Because the vacuum breaks first at the edge of the platen air flows between the drum and product allowing the product to stick to the platen leaving no material in the drum. Any material left at the bottom of the drum 42 adheres to the plate face 316 to be drawn up for easy removal by an operator.

The material is cut into increments by cutting apparatus 26 as it exits from the discharge port 70 to the conveyor 18 to charge to compounding system 14. Cutting can be accomplished by various cutting mechanisms, including a cutting head disposed at an outlet end, port 70 of the feed tube 24. In the FIG. 4, FIG. 5 and FIG. 6 embodiment, the MEA 16 includes a cutting apparatus 26 located at discharge port 70. The cutting apparatus 26 includes rails 80 that secure cutting wire 82 to guide the wire 82 to cut material exiting the feed tube discharge port 70. The rails 80 secure the cutting wire 82 to traverse the feed tube 24 longitudinal axis at discharge port 70 when activated by container 30 via lines 84 and 86 (FIG. 1).

The controller 30 of FIG. 1 illustrates an embodiment of the invention. The controller 30 of FIG. 1 can be a microprocessor, computer, data processing device, semiconductor chip or the like. Controller 30 is respectively connected to loss of weight scales 28 via lines 92 to sense loss of weight as material is expressed from the drums 42 to conveyor 18. The controller 30 computes a weight of material charged to the conveyor 18 by the difference between an initial weight of the MEA 16 and initially emplaced and full drum 42. In the embodiment of the drawings, the controller 30 can sense an initial total weight of all the MEAs 16 and emplaced full drums 42 of the MEA battery of for example, the three shown in FIG. 1. The controller 30 monitors the combined weight as material in the drums is evacuated to the conveyor 18. The controller 30 contemporaneously calculates a weight of material charged to the conveyor 18 and hence to the compounding system according to a difference between the initial total weight and contemporaneously second total weight.

The controller 30 also can control operation of cutting apparatus 26 according to the calculated charged material weight. Initially, the cutting apparatus 26 can be programmed to make cuts of about "football" sized material, for example to fit into a 14" inner diameter screw conveyor 18. Once a piece of material is cut from the feed tube discharge port 70, floor scale 28 senses a contemporaneous weight and feeds this signal back to the controller 30. The controller 30 controls the material processing system 10 according to "set points." In this application, a "set point weight or amount" is a target quantity or amount of material to be fed form a feed system, usually in a feed session. In one embodiment, "set point weight or amount" means a point weight or amount at which the feed session is to be terminated. In another embodiment, as the controller 30 senses a contemporaneous weight signal to be charged (for example within 15 pounds of "set point weight or amount") to the compounding system 14, the controller can signal the cutting apparatus 26 via lines 84 to increase cut frequently to produce smaller incremental pieces. The smaller pieces at approach to set point weight or amount permit improved control of feed to attain a charged material weight within a prescribed tolerance range, for example ±2 pounds for a batch.

As the drum 42 evacuation process is completed, door fasteners of the hinged enclosures 52 and 56 open and a controller 30 Run Screen can display "NEW DRUM." A beacon light mounted on the container evacuator 22 can turn yellow, indicating another drum 42 is ready to be changed. The hydraulic platen driving motor terminates and the chamber 50 enclosures open. The evacuator 22 is reloaded with a drum and the process repeated.

As material is charged from the MEAs 16 tote screw conveyor 18, the conveyor is turning at low rpms to feed the material to the mixer. The screw is programmed to stop turning 90 seconds after the last MEA 16 makes its last cut. This time can be adequate to clear all material from the conveyor 18.

Conveyor 18 transports and drops the cut viscous material to chute 20 to compounding system 14, which includes mixer 32 such as Banbury, roll mill 34, conveyor belt 36 and compounder 38. In the mixer 32, fumed silica, the silicone gum and a treating agent can be added to form a densified polymer/filler mass. After the gum feed is mixed, it is dropped into the nip 46 of roll mill 34 where the material is rolled into a strip form. After a drop, a programmed logic controller (PLC), for example controller 30 verifies that the mixer drop door has opened, then reclosed and is ready for feed. For any residual material that hangs in the chute, a "pusher" is programmed to sweep a few seconds after the conveyor 18 stops. This serves to scrape down the chute 20, and ensure all material gets into the mixer 32 to correctly formulate the batch.

The mill imparts a final mix to fully incorporate filler and to cool material. Then, the material is stripped from the mill in a strip form. The strip form is fed by means of conveyor belt 36 into compounder 38, which may be an extruder. The compounder 38 serves to clean and form the material for packaging. The material can be packaged and boxed through an automated cut, weigh and packaging system.

The following Example is illustrative and should not be construed as a limitation on the scope of the claims.

EXAMPLE

This EXAMPLE is a combined description of press (MEA) experiments at Schwerdtel US headquarters (New Jersey), ProSys Corporation (Missouri), and at GE Silicones Waterford, N.Y. Experiments on a shaftless screw conveyor were conducted at GE Silicones Waterford using Martin Sprocket equipment.

A viscous material feed system as schematically illustrated in the drawings included a Schwerdtel S 6-F drum press mounted to Vishay BLH floor scale that measured material flow according to loss of weight. The Schwerdtel S 6-F press included a hydraulic pressure driven cylinder and platen that drives a platen into the 55 gallon drum.

The feed system included a feed tube to receive material expressed from a drum by the press and a pneumatic solenoid operated cutting system that metered material from the feed tube to a 12"×24' shaftless screw conveyor according to loss of weight sensed by the scale. The screw conveyor interfaced to a chute. The chute permitted material to fall via gravity directly to a Banbury mixer. Material remaining in the chute was cleared by a pneumatic pusher prior to each mix (GE design and fabrication). The system was controlled by operators at two (2) QuickPanel LM90 touch screens of a control system.

In operation, an operator first entered set point weight or amounts into a system controller. In this embodiment, one set point weight or amount represented a target batch of silicone gum to be charged to a Banbury mixer, which was part of a silicone gum compounding system. A pallet of four (4) fifty-five (55) gallon drums of silicone polymer (Viscosity Range 150,000 to 900,000 Poise) was placed on a drum carousel. The 55-gallon straight-sided steel drums were delivered by the carousel and one drum was loaded into the Schwerdtel S 6-F drum press using an Easy Lift Equipment Drum Hauler unit. The Schwerdtel S 6-F drum press was controlled by a GE Fanuc 90/30 PLC. Material was displaced, from the drum to the feed tube by the hydraulic Schwerdtel gum press.

The operator pressed a START OR RESTRT BATCH button of the controller to commence operation. The press doors were secured by hydraulically driven fasteners. Then, as the screw conveyor started turning, the hydraulically driven press platen commenced traveling down into the drum. As a platen traversed the drum, drum contents were squeezed upward into the feed tube. When the platen completed traversing the drum axis, the operation was terminated and the platen was withdrawn. As the platen was withdrawn, a vacuum between the bottom of the platen and adhering material was interrupted first selectively at the platen face circumference. The selective interruption caused substantially all remaining viscous material from the drum to remain adhered to the platen face to be removed and fed into the feed tube by a worker. As material exited the feed tube, a pneumatic solenoid operated cutting system diced the material into pieces that then fell into a 12"×24' shaftless screw conveyor to charge to a Banbury mixer.

A batch of material flow from conveyor to the Banbury mixer was measured by loss of weight detected by the Vishay BLH load cells. A combined weight of presses, feed tubes, cutting mechanisms and material-containing drums was registered by the control system as a first weight. The control system monitored a charged weight of silicone gum to the Banbury by registering progressing weight as silicone gum was pressed from the drums and expelled through the feed tubes and cutting systems. The control system displayed a differential between the first weight and registered progressive weights that represented a charged silicone gum weight. The cutting mechanism rate was increased when charged silicone gum weight was within 15 pounds of the set point weight. The control system continued to sense the differential weight and terminated the batch operation when the differential weight registered within a ±2 pound range of the set point weight or amount.

The EXAMPLE illustrates control of material charge to a compounding system according to the invention.

The invention includes changes and alterations that fall within the purview of the following claims. The foregoing examples are merely illustrative of the invention, serving to illustrate only some of the features of the present invention. For example, the invention includes a controller with a set of instructions: to refer to a look-up data base to determine a set point weight or amount for a material to be charged to a compounding system; sensing an initial combined weight of a material extracting apparatus and a container with material; signaling commencement of the material extracting apparatus operation to evacuate the material from the container; sensing a progressing combined weight of the material extracting apparatus and the container with material; calculating a charged material weight according to a difference between the initial combined weight and the sensed progressing combined weight; and terminating the material extracting apparatus operation when a calculated charged material weight is within a specified range of the set point weight or amount.

The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention.

As used in the claims, the word "comprises" and its grammatical variants logically also subtend and include phrases of varying and differing extent such as for example, but not limited thereto, "consisting essentially of" and "consisting of."

Where necessary, ranges have been supplied, those ranges are inclusive of all sub-ranges there between. Such ranges may be viewed as a Markush group or groups consisting of differing pairwise numerical limitations which group or groups is or are fully defined by its lower and upper bounds, increasing in a regular fashion numerically from lower bounds to upper bounds. It is to be expected that variations in these ranges will suggest themselves to a practitioner having ordinary skill in the art and where not already dedicated to the public, those variations should where possible be construed to be covered by the appended claims.

It is also anticipated that advances in science and technology will make equivalents and substitutions possible that are not now contemplated by reason of the imprecision of language and these variations should also be construed where possible to be covered by the appended claims.

All United States patents (and patent applications) referenced herein are herewith and hereby specifically incorporated by reference in their entirety as though set forth in full.

The invention includes changes and alterations that fall within the purview of the following claims.

The invention claimed is:

1. A viscous material feed system, comprising:
   a feed tube that receives material expressed from a container; and
   a container evacuator comprising a chamber to hold a container to express material from the container to the feed tube and a plunger comprising a platen axially connected to a driving piston and slidably accommodated within the chamber, an O-ring fitted against a platen driving face positioned between the platen and the platen driving face and; a feed tube that has at least one inlet on the platen driving face, a full ring with tabs extending to secure the O-ring to the platen driving face with a circumferential surface exposed to the chamber and a vacuum breaker valve to the chamber that seals the platen driving face when in contact with container material and retains residual material adhering to the platen driving face when the vacuum breaker valve is activated at a termination of a driving cycle of the platen through a container's contents;
   wherein the O-ring comprises a circumferential slope surface and the full ring comprises a bevel surface that fits complementarily to the circumferential slope surface to form a disruptable seal of bevel surface to slope surface until the vacuum breaker valve is activated to cause sag of the exposed circumferential surface to disrupt the seal.

2. The viscous material feed system of claim 1, wherein the O-ring comprises a circumferential slope surface and the full ring comprises a bevel surface that fits complementarily to the circumferential slope surface to form a disruptable seal of bevel surface to slope surface until the vacuum breaker valve is activated to cause sag of the exposed circumferential surface to disrupt the seal and permit air how beneath adhered material to retain material to the platen driving face as the platen is withdrawn from the container at the conclusion of an expressing cycle.

3. The viscous material feed system of claim 1, wherein the platen comprises at least two ports through the platen driving face that are located at balancing equal circumferential spacing from a central activating piston to the platen.

4. The viscous material feed system of claim 1, wherein the platen comprises at least two ports through the platen driving face that are symmetrically located through the platen driving face with respect to a central activating piston of the platen and comprises conduit tines from respective ports communicating to the feed tube.

5. The viscous material feed system of claim 1, further comprising a controller with a set of instructions to (i) store an input value representing a material set point, (ii) sense an initial combined weight of the material extracting apparatus and a container with material; (iii) sense a progressing combined weight of the material extracting apparatus and the container with material as material is metered from a dicing apparatus; (iv) calculate a material weight charged from the feed system to a subsequent process according to a difference between the initial combined weight and the sensed progressing combined weight; and terminate the material extracting apparatus operation when a calculated charged material weight is within a specified range of the set point.

6. The viscous material feed system of claim 1, comprising a plurality of combinations of container evacuators and feed tubes.

7. The viscous material feed system of claim 1, wherein the material comprises a siloxane of a viscosity of greater than 150,000 poise at 25.degree. C.

8. The viscous material feed system of claim 1, wherein the material comprises a siloxane of a viscosity of greater than 500,000 poise at 25.degree. C.

9. The viscous material feed system of claim 1, wherein the material comprises a siloxane of a viscosity of greater than 900,000 poise at 25.degree. C.

10. A viscous material feed method, comprising:
    driving a platen driving face against a surface of a viscous material held in a container;
    creating a vacuum between the platen driving face and viscous material surface to adhere residual material from the container to the platen driving face;
    differentially breaking the vacuum at a circumference of the residual adhered material comprising disrupting the vacuum first at a circumferential area of the platen driving face to flow air beneath the adhered material to cause material to adhere against the platen driving face and retaining the residual material adhered to the platen driving face to permit withdrawal of the residual material from the container along with the platen driving face.

11. The method of claim 10, comprising reversing the platen driving face from against the surface of the viscous material to disrupt the vacuum between the viscous material and the platen driving face.

12. The method of claim 10, comprising driving a valved platen driving face against the surface of the viscous material held in the container to close a valve to form the vacuum; and reversing the platen driving face from against the surface of the viscous material to open the valve to disrupt the vacuum between the viscous material and the platen driving face.

13. The method of claim 10, comprising expressing viscous material from the container by driving the platen driving face against the surface of the viscous material; cutting viscous material that is expressed from the container for feed to a viscous material compounding process at a first rate and increasing the rate when an amount of viscous material charged to the compounding process attains a predetermined range of a set point of material; and continuing cutting and charging material to the compounding process at a faster cutting rate to complete feed to the compounding process within a predetermined range of a set point of material.

14. The method of claim 10, comprising expressing viscous material from a plurality of containers by driving platen faces of a battery of feed systems against surfaces of viscous material to force viscous material from the containers.

15. The method of claim 10, wherein the material comprises a siloxane of a viscosity of greater than 150,000 poise at 25.degree. C.

* * * * *

UNITED STATES PATENT AND TRADEMARK OFFICE
CERTIFICATE OF CORRECTION

PATENT NO. : 7,600,658 B2 Page 1 of 1
APPLICATION NO. : 11/563810
DATED : October 13, 2009
INVENTOR(S) : Roger Knox, Jennifer L. Stanton and Harry C. Bayley It is certified that error appears in the above-identified patent and that said Letters Patent is hereby corrected as shown below:

Title Page
At column 1, (73):

"Jennifer L. Stanton, Clifton, NY (US);
Harry A. Bayley, Mechanicville, NY (US);
Roger Knox, Clifton Park, NY (US)"

should be:

--Roger Knox, Clifton Park, NY (US);
Jennifer L. Stanton, Clifton Park, NY (US);
Harry C. Bayley, Mechanicville, NY (US)--

Signed and Sealed this

Twenty-second Day of December, 2009

David J. Kappos
*Director of the United States Patent and Trademark Office*